(12) United States Patent
Liu

(10) Patent No.: US 8,404,984 B2
(45) Date of Patent: Mar. 26, 2013

(54) LIGHTED KEYBOARD

(75) Inventor: Yung-Lung Liu, Taichung Hsien (TW)

(73) Assignee: Sunrex Technology Corp., Taichung (TW)

( * ) Notice: Subject to any disclaimer, the term of this patent is extended or adjusted under 35 U.S.C. 154(b) by 337 days.

(21) Appl. No.: 12/911,032

(22) Filed: Oct. 25, 2010

(65) Prior Publication Data

US 2012/0097511 A1   Apr. 26, 2012

(51) Int. Cl.
*H01H 9/26* (2006.01)
*H01H 13/72* (2006.01)
*H01H 13/76* (2006.01)

(52) U.S. Cl. ............... 200/5 A; 200/314; 200/344

(58) Field of Classification Search ............ 200/5 A, 200/344

See application file for complete search history.

(56) References Cited

U.S. PATENT DOCUMENTS

| 7,847,204 B2* | 12/2010 | Tsai .............. 200/314 |
| 8,173,922 B2* | 5/2012 | Chen ............. 200/314 |
| 8,247,714 B2* | 8/2012 | Tsai .............. 200/5 A |
| 2012/0012448 A1* | 1/2012 | Pance et al. ...... 200/5 A |

\* cited by examiner

*Primary Examiner* — Renee Luebke
*Assistant Examiner* — Lheiren Mae Caroc

(57) ABSTRACT

A lighted keyboard includes transparent, rectangular keys each comprising a bottom stem; scissors shaped structures disposed under the keys, each scissors shaped structure being aligned with the stem and comprising a first frame and a second frame pivotally secured together; an OLED sheet disposed under the scissors shaped structures and comprising units each including a hole; an optically transmissive rubber plate disposed under the OLED sheet and comprising units each including a resilient dome passing through the hole of the unit of the OLED sheet, the resilient dome having a conductive shaft aligned with the stem; a membrane circuit board disposed under the rubber plate and comprising a plurality of contacts each aligned with the conductive shaft; and a rectangular aluminum plate disposed under the membrane circuit board and comprising units each including snapping grooves and a slide guide groove secured to the scissors shaped structure.

3 Claims, 8 Drawing Sheets

LIGHTED KEYBOARD

BACKGROUND OF THE INVENTION

1. Field of Invention

The invention relates to keyboards and more particularly to a lighted keyboard with improved characteristics.

2. Description of Related Art

Laptops are widely used by people through out the world due to lightweight and compactness. Typically, a laptop is equipped with a membrane keyboard having a scissors type structure. The scissors type structure is mounted between upper keycaps and a lower rubber plate. However, no backlight is provided by the membrane keyboard. Hence, a user has to operate the laptop in bright environment. This inevitably limits applications of the laptop.

There is a prior art about backlighting for computer keyboard. The keyboard comprises a rubber plate with fastening members for securing scissors shaped structures thereon. No mechanisms are provided to uniformly guide light to undersides of keys. Also, distance from one key to LEDs (light emitting diodes) (i.e., light sources) may be different from distance from another key to the LEDs. That is, traveling distances of the LED light are different. Hence, some proximate keys may be sufficiently illuminated while distal keys may be insufficiently illuminated. In brief, light distribution is not even.

There is another conventional illuminated keyboard commercially available. The keyboard comprises an LED assembly (i.e., light source) on a bottom cabinet, an aluminum plate on the LED assembly, a membrane circuit board on the aluminum plate, and scissors shaped structures and keys on the membrane circuit board. Light emitted by the LED assembly may pass through holes of the aluminum plate and the membrane circuit board toward the undersides of the keys for illumination. However, the provision of the aluminum plate between the LED assembly and the membrane circuit board can increase greatly thickness of the keyboard. That is, the desired feature of a thin keyboard cannot be obtained. Further, its assembly is complicated and time consuming.

OLEDs (organic light emitting diodes) have been widely employed in various lighting and electronic devices including television screens, computer monitors, small, portable system screens such as mobile phones and PDAs, watches, advertising, information and indication. OLEDs can also be used in light sources for general space illumination and in large-area light-emitting elements. In OLED, the emissive electroluminescent layer is a film of organic compounds that emits light when an electric current passes through it. This layer of organic semiconductor material is formed between two electrodes. OLEDs can emit less light per unit area than inorganic solid-state based LEDs similarly designed for use as point-light sources. An OLED display functions without a backlight and so can display deep black levels and can be thinner and lighter than established liquid crystal displays. Similarly, in conditions of low ambient light such as dark rooms, an OLED screen can achieve a higher contrast ratio than either an LCD screen using cold cathode fluorescent lamps or the more recently developed LED backlight. Thus, continuing improvements and applications of OLED backlight are constantly desired.

SUMMARY OF THE INVENTION

It is therefore one object of the invention to provide a lighted keyboard having an OLED sheet as backlight so that the lighted keyboard can be made thin.

It is another object of the invention to provide a lighted keyboard having advantages including reduced assembly time, easy maintenance, high yield, and greatly decreased manufacturing cost.

In one aspect of the invention there is provided a lighted keyboard comprising a plurality of transparent, rectangular keys each comprising a bottom stem; a plurality of scissors shaped structures disposed under the keys, each scissors shaped structure being aligned with the stem and comprising a first frame and a second frame pivotally secured together; an OLED sheet disposed under the scissors shaped structures and comprising a plurality of units each including a hole; an optically transmissive rubber plate disposed under the OLED sheet and comprising a plurality of units each including a resilient dome passing through the hole of the unit of the OLED sheet, the resilient dome having a conductive shaft aligned with the stem; a membrane circuit board disposed under the rubber plate and comprising a plurality of contacts each aligned with the conductive shaft; and a rectangular aluminum plate disposed under the membrane circuit board and comprising a plurality of units each including a plurality of snapping grooves and a slide guide groove wherein the corresponding snapping grooves, the slide guide groove, and the scissors shaped structure are secured together.

In another aspect of the invention there is provided a lighted keyboard comprising a plurality of transparent, rectangular keys each comprising a bottom stem; a plurality of scissors shaped structures disposed under the keys, each scissors shaped structure being aligned with the stem and comprising a first frame and a second frame pivotally secured together; an optically transmissive rubber plate disposed under the scissors shaped structures and comprising a plurality of units each including a resilient dome passing through the scissors shaped structure, the resilient dome having a conductive shaft aligned with the stem; an OLED sheet disposed under the rubber plate and comprising a plurality of units each including a hole; a membrane circuit board disposed under the OLED sheet and comprising a plurality of contacts each aligned with the conductive shaft; and a rectangular aluminum plate disposed under the membrane circuit board and comprising a plurality of units each including a plurality of snapping grooves and a slide guide groove wherein the corresponding snapping grooves, the slide guide groove, and the scissors shaped structure are secured together.

In a further aspect of the invention there is provided a lighted keyboard comprising a plurality of transparent, rectangular keys each comprising a bottom stem; a plurality of scissors shaped structures disposed under the keys, each scissors shaped structure being aligned with the stem and comprising a first frame and a second frame pivotally secured together; an optically transmissive rubber plate disposed under the scissors shaped structures and comprising a plurality of units each including a resilient dome, the resilient dome having a conductive shaft aligned with the stem; an optically transmissive membrane circuit board disposed under the rubber plate and comprising a plurality of contacts each aligned with the conductive shaft; an OLED sheet disposed under the membrane circuit board and comprising a plurality of units; and a rectangular aluminum plate disposed under the OLED sheet and comprising a plurality of units each including a plurality of snapping grooves and a slide guide groove wherein the corresponding snapping grooves, the slide guide groove, and the scissors shaped structure are secured together.

The above and other objects, features and advantages of the invention will become apparent from the following detailed description taken with the accompanying drawings.

DETAILED DESCRIPTION OF THE INVENTION

Figure 1:
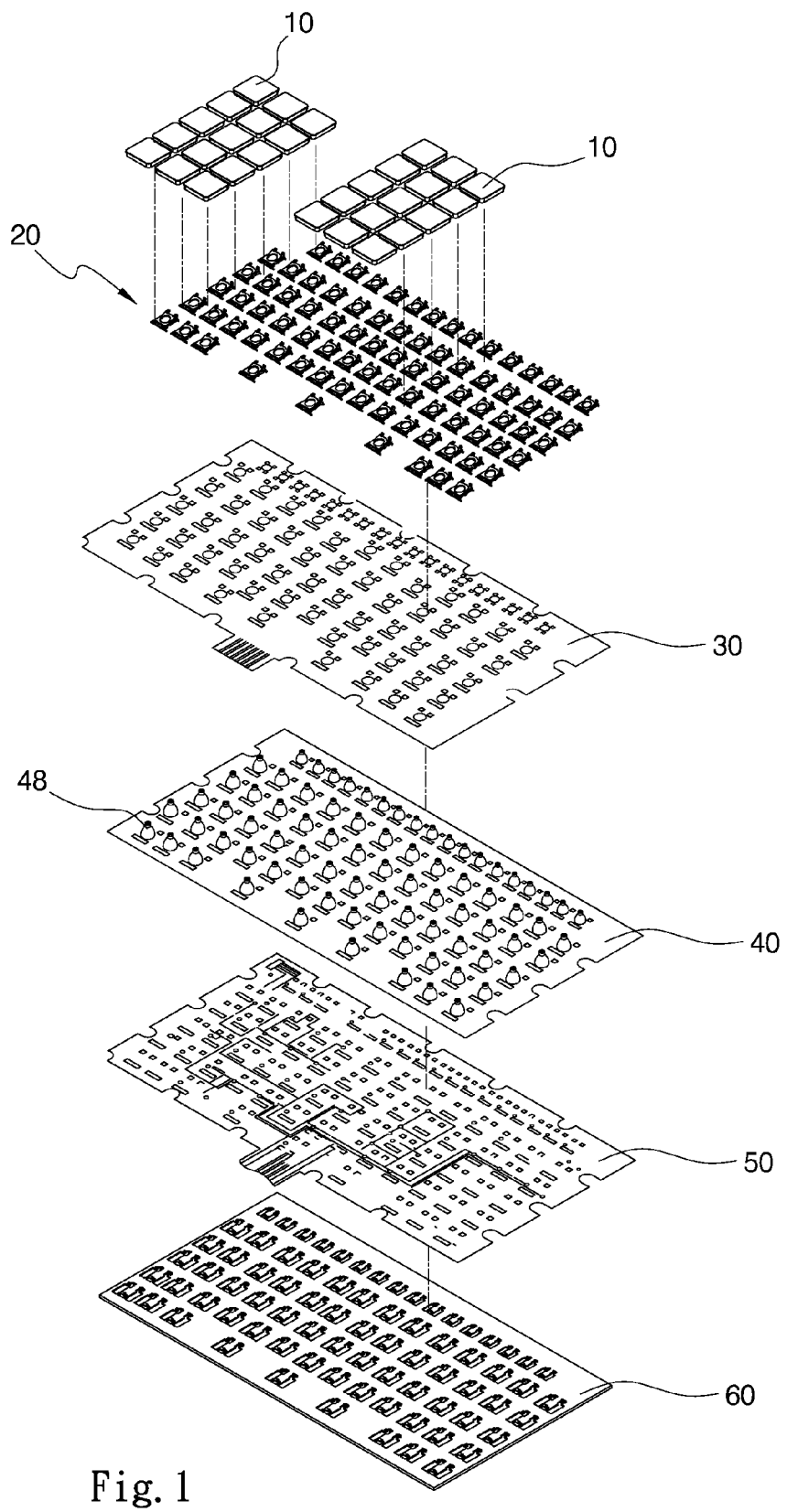
FIG. 1 is an exploded view of a lighted keyboard according to a first preferred embodiment of the invention.
Figure 2:
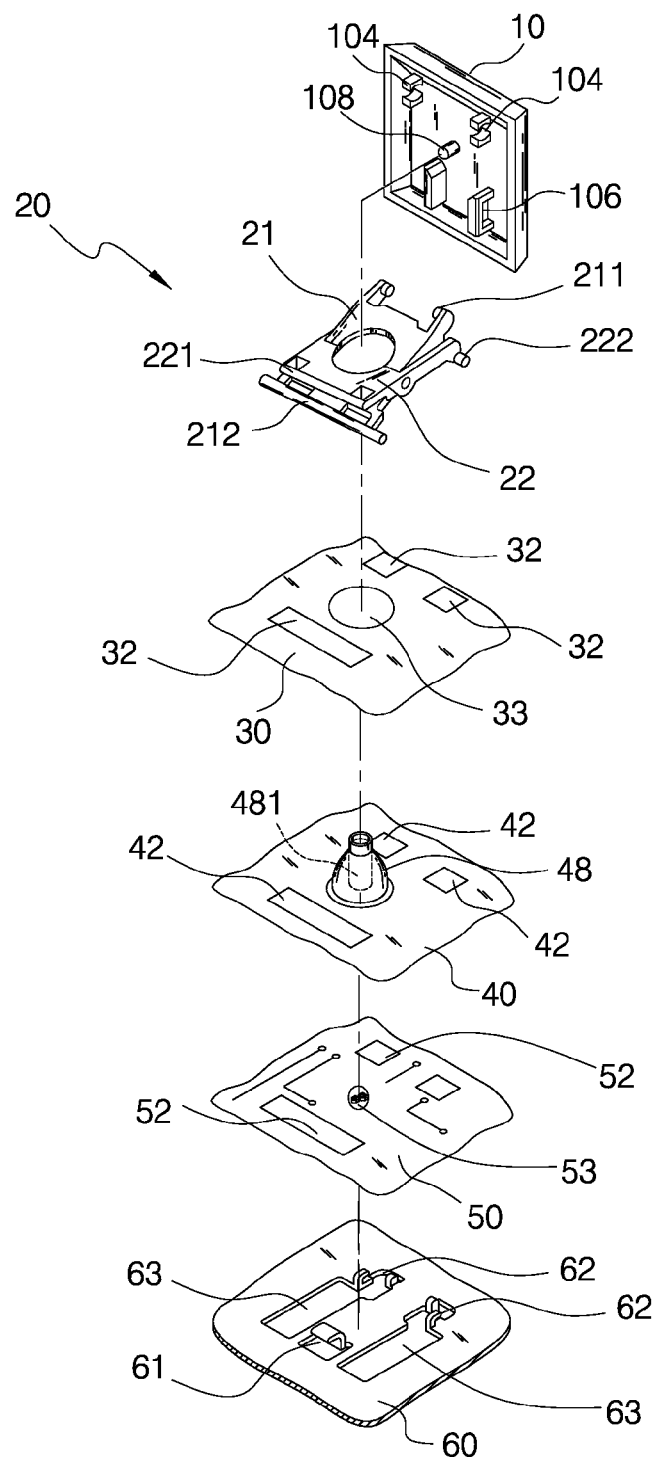
FIG. 2 is an exploded view of portions of the lighted keyboard shown in FIG. 1.
Figure 3:
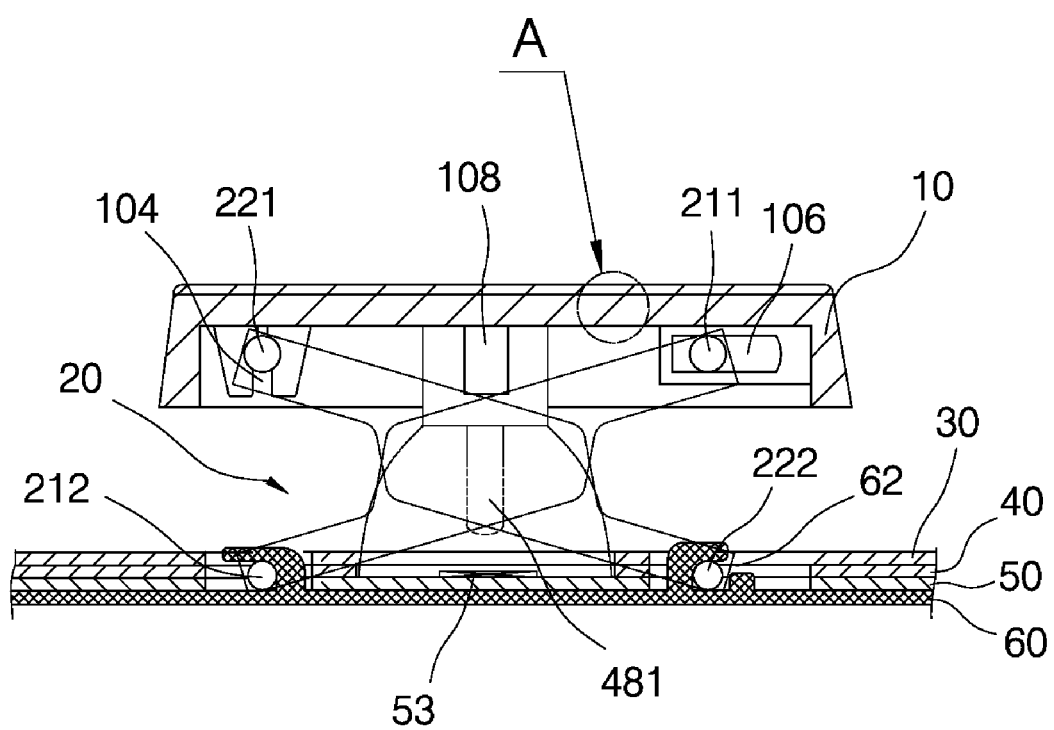
FIG. 3 is a longitudinal sectional view of the assembled components shown in FIG. 2.
Figure 4:
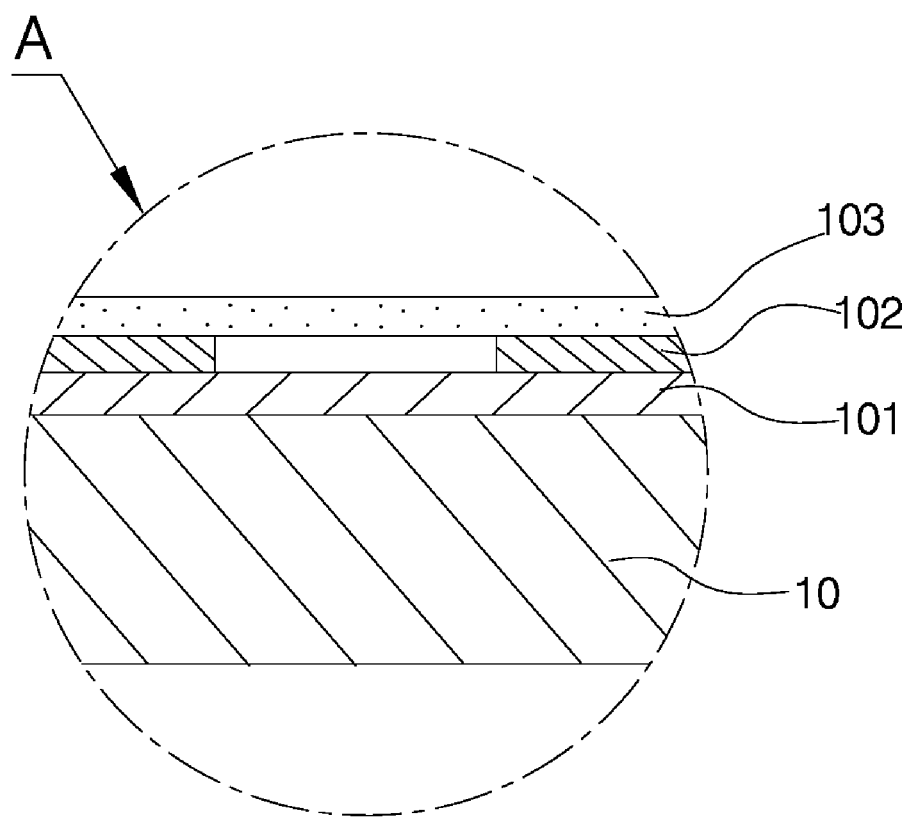
FIG. 4 is a detailed view of the area in circle A of FIG. 3.

Referring to FIGS. 1 to 4, a lighted keyboard in accordance with a first preferred embodiment of the invention comprises a plurality of optically transmissive keys 10, a plurality of scissors shaped structures 20, an OLED sheet 30, a rubber plate 40, a membrane circuit board 50, and an aluminum plate 60. Each component will be discussed in detailed below.

The key 10 is transparent, rectangular. A user may press the key 10 for data input, etc. On the bottom of the key 10, there are provided two pivot grooves 104, two slide guide grooves 106 together with the pivot grooves 104 arranged as four corners of a virtual quadrilateral, and a stem 108 extending downward from center. On top of the key 10 there are coated with, from bottom to top, a multi-color, optically transmissive dye layer 101 so that different areas of the key top may have different colors (i.e., the key 10 being colorful), an opaque layer 102 having portions removed by laser oblation so that characters printed or engraved between the key 10 and the multi-color, optically transmissive dye layer 101 can be viewed through the removed portions of the opaque layer 102, and a transparent protective layer 103 for protecting the layers and characters therebelow. Key characters may be grouped as a plurality of groups of different colors so that a user may easily distinguish characters prior to pressing the transparent keys 10.

The scissors shaped structures 20 are disposed under the keys 10. The scissors shaped structure 20 comprises two first slide axles 211 at two corners of a first frame 21, two second pivot shafts 222 at two corners of a second frame 22 pivotal about the first frame 21, two second pivot shafts 222 being below the first slide axles 211, a first pivot shaft 221 at the other side of the second frame 22, a second slide axle 212 at the other side of the first frame 21 parallel to and below the first pivot shaft 221, and a central circular hole (not numbered). The first slide axles 211 are slidably secured to the slide guide grooves 106 and the first pivot shaft 221 is rotatably secured to the pivot grooves 104 respectively.

The OLED sheet 30 is provided under the scissors shaped structures 20. The OLED sheet 30 may be replaced by a FOLED (flexible organic light emitting diode) sheet in alternative embodiments. The OLED sheet 30 is grouped as a plurality of units each comprising a plurality of openings 32 each with the second pivot shafts 222 or the second slide axle 212 disposed therein, and a central hole 33 with the stem 108 passing through.

In OLED, the emissive electroluminescent layer is a film of organic compounds that emits light when an electric current passes through it. This layer of organic semiconductor material is formed between two electrodes. OLEDs are advantageous for being low energy consumption, less heat generation, lightweight, compactness, and high brightness. Light emitted by the OLED sheet 30 may illuminate the undersides of the keys 10 to render a colorful keyboard when in use.

The rubber plate 40 is optically transmissive and is disposed under the OLED sheet 30. On the rubber plate 40 there are provided a plurality of units each including a resilient dome 48 through the holes of the OLED sheet 30 and the scissors shaped structure 20, the resilient dome 48 having a conductive shaft 481 aligned with the stem 108 so that the shaft 481 can move downward as the stem 108 moves downward when the key 10 is pressed, and three rectangular holes 42 each with the second pivot shafts 222 or the second slide axle 212 disposed therein.

The membrane circuit board 50 is provided under the rubber plate 40 and comprises a circuitry (not numbered) and a plurality of units each having a plurality of openings 52 each with the second pivot shafts 222 or the second slide axle 212 disposed therein, and a central contact 53 aligned with the conductive shaft 481 thereabove so that a key switch can be closed (i.e., key pressing signal being generated) when the downward moving stem 108 causes the conductive shaft 481 to contact the contact 53 for electrical connection.

The aluminum plate 60 is provided under the membrane circuit board 50. The aluminum plate 60 is a rectangular support and comprises a plurality of units each corresponding to the scissors shaped structure 20. Each unit of the aluminum plate 60 comprises two parallel openings 63, two snapping grooves 62 each at one end of the opening 63 for retaining the second pivot shafts 222, and a slide guide groove 61 between the other ends of the openings 63 for retaining the second slide axle 212.

Figure 5:
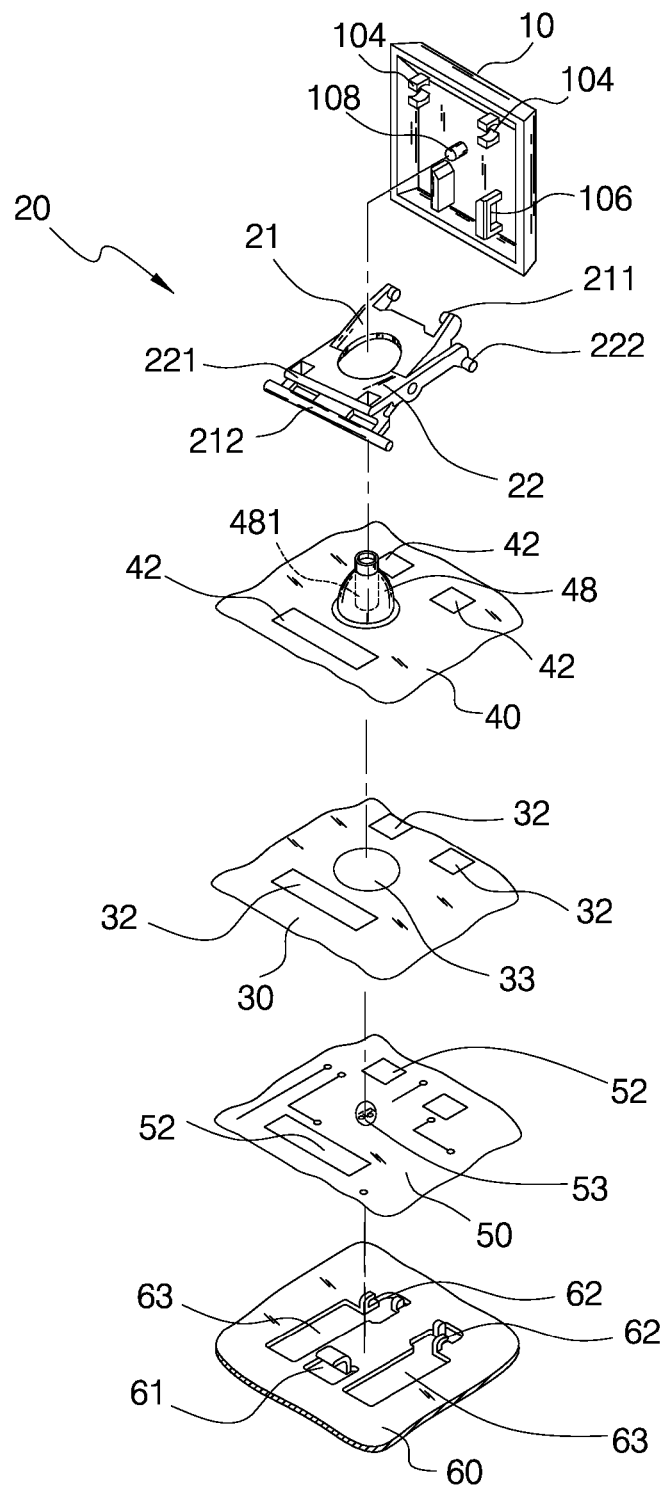
FIG. 5 is an exploded view of portions of a lighted keyboard according to a second preferred embodiment of the invention.
Figure 6:
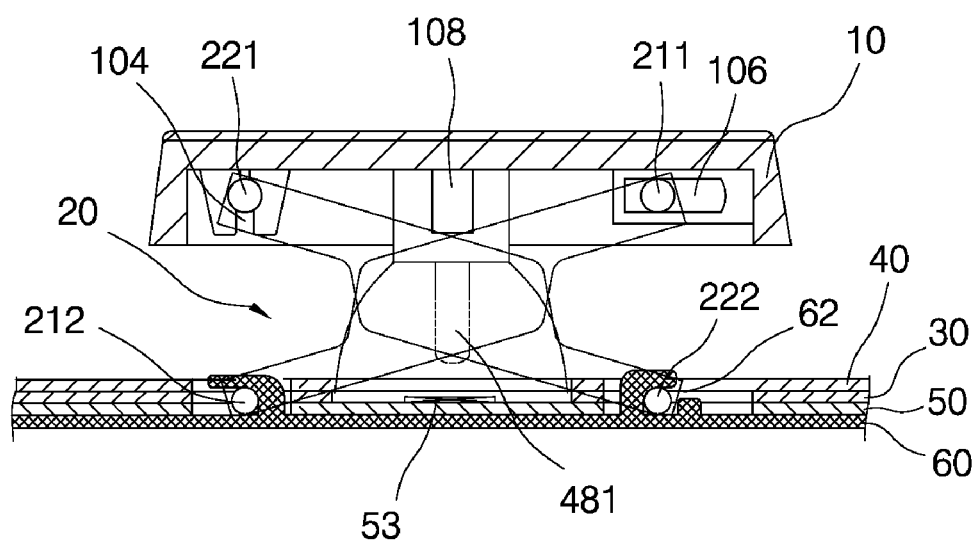
FIG. 6 is a longitudinal sectional view of the assembled components shown in FIG. 5.

Referring to FIGS. 5 and 6, a lighted keyboard in accordance with a second preferred embodiment of the invention is shown. The characteristics of the second preferred embodiment of the invention are discussed in detail below.

Locations of the OLED sheet 30 and the rubber plate 40 are exchanged. That is, the OLED sheet 30 is below the rubber plate 40. The optically transmissive rubber plate 40 can uniformly direct light emitted by the OLED sheet 30 toward the undersides of the keys 10. The conductive shaft 481 may move downward as the stem 108 moves downward when the key 10 is pressed. Further, a key switch can be closed (i.e., key pressing signal being generated) when the downward moving stem 108 causes the conductive shaft 481 to contact the contact 53 for electrical connection.

Figure 7:
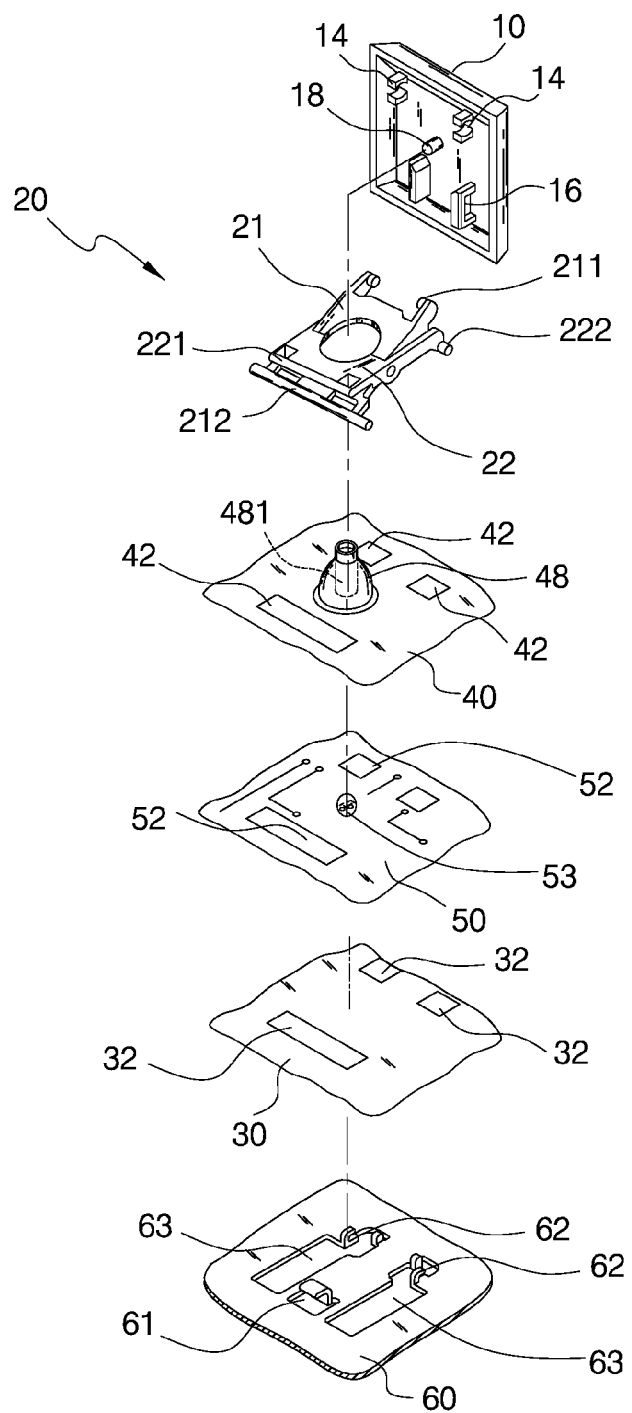
FIG. 7 is an exploded view of portions of a lighted keyboard according to a third preferred embodiment of the invention.
Figure 8:
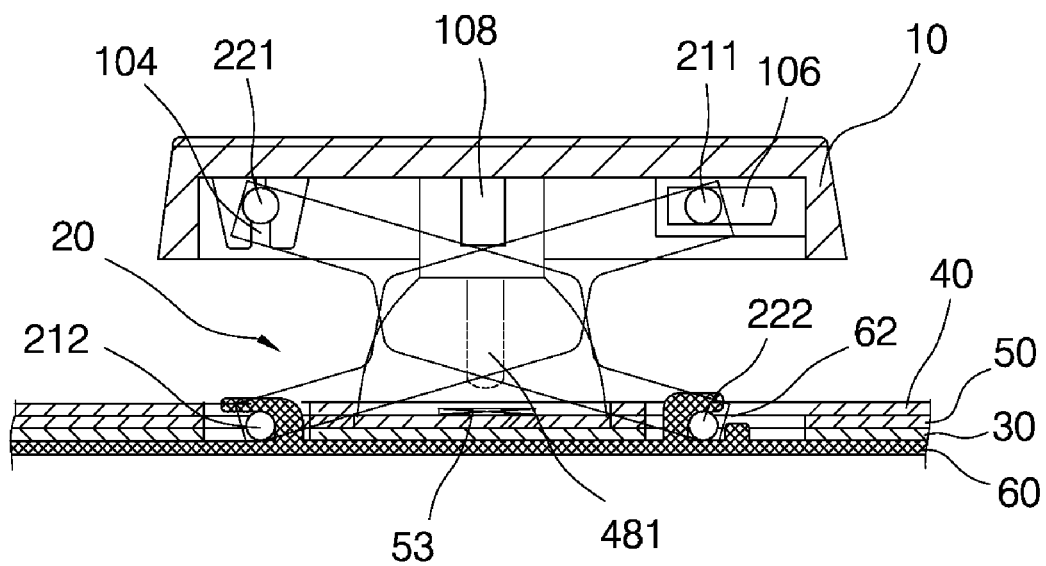
FIG. 8 is a longitudinal sectional view of the assembled components shown in FIG. 7.

Referring to FIGS. 7 and 8, a lighted keyboard in accordance with a third preferred embodiment of the invention is shown. The characteristics of the third preferred embodiment of the invention are discussed in detail below.

Locations of the OLED sheet 30, the rubber plate 40, and the membrane circuit board 50 are arranged as the rubber plate 40 being in the upper position, the membrane circuit board 50 being in the middle position, and the OLED sheet 30 being in the lower position. Both the optically transmissive rubber plate 40 and membrane circuit board 50 can uniformly direct light emitted by the OLED sheet 30 toward the undersides of the keys 10. The conductive shaft 481 may move downward as the stem 108 moves downward when the key 10 is pressed. Further, a key switch can be closed (i.e., key pressing signal being generated) when the downward moving stem 108 causes the conductive shaft 481 to contact the contact 53 for electrical connection. It is noted that the OLED sheet 30 is without the provision of the central hole.

Advantages and characteristics of the lighted keyboard of the invention are described below. It can be made thin. Location of the OLED sheet 30 can be configured to be above both the rubber plate 40 and the membrane circuit board 50, between the rubber plate 40 and the membrane circuit board 50, or under both the rubber plate 40 and the membrane circuit board 50. Assembly and maintenance are easy and time saving. The manufacturing cost is greatly decreased. Finally, the OLED sheet 30 is low in energy consumption, generates less heat, and is lightweight, compact, and very bright. Light emitted by the OLED sheet 30 may illuminate the undersides of the keys 10 to render a colorful keyboard when in use.

While the invention has been described in terms of preferred embodiments, those skilled in the art will recognize that the invention can be practiced with modifications within the spirit and scope of the appended claims.

What is claimed is:

1. A lighted keyboard comprising:
a plurality of transparent, rectangular keys each comprising a bottom stem;
a plurality of scissors shaped structures disposed under the keys, each scissors shaped structure being aligned with the stem and comprising a first frame and a second frame pivotally secured together;
an OLED sheet disposed under the scissors shaped structures and comprising a plurality of units each including a hole;
an optically transmissive rubber plate disposed under the OLED sheet and comprising a plurality of units each including a resilient dome passing through the hole of the unit of the OLED sheet, the resilient dome having a conductive shaft aligned with the stem;
a membrane circuit board disposed under the rubber plate and comprising a plurality of contacts each aligned with the conductive shaft; and
a rectangular aluminum plate disposed under the membrane circuit board and comprising a plurality of units each including a plurality of snapping grooves and a slide guide groove;
wherein the corresponding snapping grooves, the slide guide groove, and the scissors shaped structure are secured together;
wherein on the bottom of the key there are further provided two pivot grooves and two slide guide grooves;
wherein the pivot grooves and the slide guide grooves are secured to the scissors shaped structure;
wherein the scissors shaped structure comprises two first slide axles at two corners of the first frame, two second pivot shafts at two corners of the second frame, the second pivot shafts being below the first slide axles, a first pivot shaft at the other side of the second frame, a second slide axle at the other side of the first frame parallel to and below the first pivot shaft, and a central circular hole;
wherein the first slide axles are slidably secured to the slide guide grooves and the first pivot shaft is rotatably secured to the pivot grooves respectively;
wherein the snapping grooves of each unit of the aluminum plate are adapted to retain the second pivot shafts, and the slide guide groove of each unit of the aluminum plate is adapted to retain the second slide axle; and
wherein the OLED sheet is a FOLED (flexible organic light emitting diode) comprising a plurality of units each including a plurality of openings with the second slide axle and the second pivot shaft of the scissors shaped structure being disposed therein, and a circular hole with the resilient dome passing through.

2. A lighted keyboard comprising:
a plurality of transparent, rectangular keys each comprising a bottom stem;
a plurality of scissors shaped structures disposed under the keys, each scissors shaped structure being aligned with the stem and comprising a first frame and a second frame pivotally secured together;
an optically transmissive rubber plate disposed under the scissors shaped structures and comprising a plurality of units each including a resilient dome passing through the scissors shaped structure, the resilient dome having a conductive shaft aligned with the stem;
an OLED sheet disposed under the rubber plate and comprising a plurality of units each including a hole;
a membrane circuit board disposed under the OLED sheet and comprising a plurality of contacts each aligned with the conductive shaft; and
a rectangular aluminum plate disposed under the membrane circuit board and comprising a plurality of units each including a plurality of snapping grooves and a slide guide groove;
wherein the corresponding snapping grooves, the slide guide groove, and the scissors shaped structure are secured together;
wherein on the bottom of the key there are further provided two pivot grooves and two slide guide grooves;
wherein the pivot grooves and the slide guide grooves are secured to the scissors shaped structure;
wherein the scissors shaped structure comprises two first slide axles at two corners of the first frame, two second pivot shafts at two corners of the second frame, the second pivot shafts being below the first slide axles, a first pivot shaft at the other side of the second frame, a second slide axle at the other side of the first frame parallel to and below the first pivot shaft, and a central circular hole;
wherein the first slide axles are slidably secured to the slide guide grooves and the first pivot shaft is rotatably secured to the pivot grooves respectively;
wherein the snapping grooves of each unit of the aluminum plate are adapted to retain the second pivot shafts, and the slide guide groove of each unit of the aluminum plate is adapted to retain the second slide axle; and
wherein the OLED sheet is a FOLED (flexible organic light emitting diode) comprising a plurality of units each including a plurality of openings with the second slide axle and the second pivot shaft of the scissors shaped structure being disposed therein.

3. A lighted keyboard comprising:
a plurality of transparent, rectangular keys each comprising a bottom stem;
a plurality of scissors shaped structures disposed under the keys, each scissors shaped structure being aligned with the stem and comprising a first frame and a second frame pivotally secured together;
an optically transmissive rubber plate disposed under the scissors shaped structures and comprising a plurality of units each including a resilient dome having a conductive shaft aligned with the stem;
an optically transmissive membrane circuit board disposed under the rubber plate and comprising a plurality of contacts each aligned with the conductive shaft;
an OLED sheet disposed under the membrane circuit board and comprising a plurality of units; and a rectangular aluminum plate disposed under the OLED sheet and comprising a plurality of units each including a plurality of snapping grooves and a slide guide groove;

wherein the resilient dome passes through the hole of the unit of the OLED sheet;

wherein the corresponding snapping grooves, the slide guide groove, and the scissors shaped structure are secured together;

wherein on the bottom of the key there are further provided two pivot grooves and two slide guide grooves;

wherein the pivot grooves and the slide guide grooves are secured to the scissors shaped structure;

wherein the scissors shaped structure comprises two first slide axles at two corners of the first frame, two second pivot shafts at two corners of the second frame, the second pivot shafts being below the first slide axles, a first pivot shaft at the other side of the second frame, a second slide axle at the other side of the first frame parallel to and below the first pivot shaft, and a central circular hole;

wherein the first slide axles are slidably secured to the slide guide grooves and the first pivot shaft is rotatably secured to the pivot grooves respectively;

wherein the snapping grooves of each unit of the aluminum plate are adapted to retain the second pivot shafts, and the slide guide groove of each unit of the aluminum plate is adapted to retain the second slide axle; and wherein the OLED sheet is a FOLED (flexible organic light emitting diode) comprising a plurality of units each including a plurality of openings with the second slide axle and the second pivot shaft of the scissors shaped structure being disposed therein.

* * * * *